June 20, 1961 C. BRAMMING 2,989,203
VACUUM BOTTLE AND CUP
Filed Nov. 17, 1953
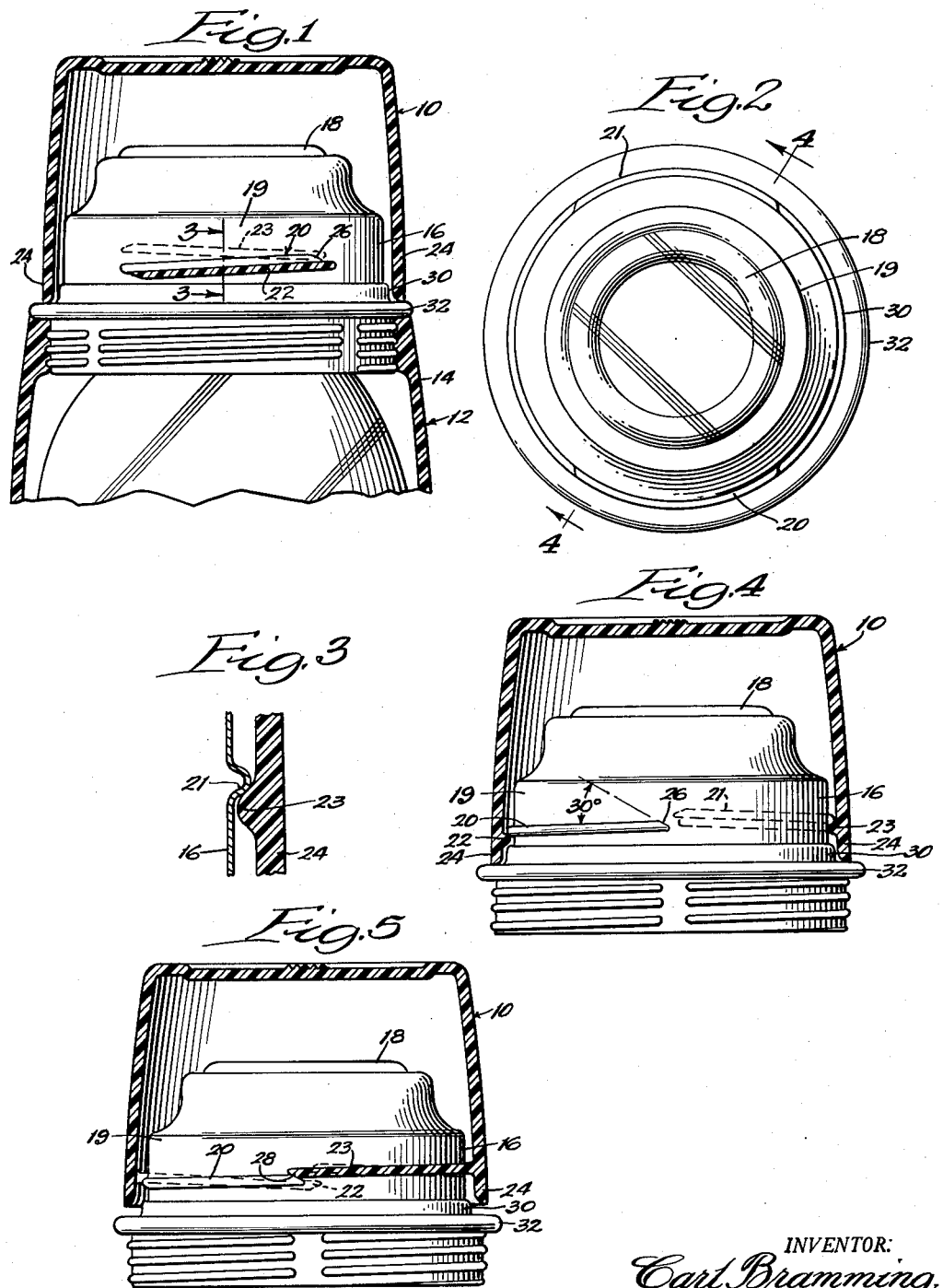
INVENTOR:
Carl Bramming.
BY
Orms, McDougall, Williams & Hersh.
ATTORNEYS.

United States Patent Office 2,989,203
Patented June 20, 1961

2,989,203
VACUUM BOTTLE AND CUP
Carl Bramming, Nashville, Tenn., assignor to Aladdin Industries, Incorporated, Nashville, Tenn., a corporation of Illinois
Filed Nov. 17, 1953, Ser. No. 392,628
4 Claims. (Cl. 215—13)

This invention relates to vacuum bottles or the like and particularly to a novel form of screw connection between the upper end of the vacuum bottle and a closure cup.

An object of the invention is to provide a vacuum bottle and a closure cup constructed in a new and improved manner so that the cup may be removed from or mounted on the bottle simply by turning the cup through a quarter revolution in one direction or the other.

It is a further object of the invention to provide a vacuum bottle and cup combination of the foregoing character which is arranged so that the novel cup may be mounted on a conventional helically threaded bottle, while the novel vacuum bottle of this invention may be used with a conventional cup having continuous single helical internal threads.

Another object of the invention is to provide a vacuum bottle and cup combination of the foregoing character which is arranged so as to prevent the cup from being mounted on the bottle in cross-threaded relation.

It is still another object of the invention to provide a vacuum bottle and cup combination of the foregoing character which is arranged so as to prevent inward springing or collapsing of the cup and thereby avoid disengagement of the cup from the bottle when the cup is screwed down very tightly.

Further objects and advantages of the invention will appear from the following description, taken with the accompanying drawing, in which:

FIGURE 1 is a central elevational sectional view of a vacuum bottle and cup combination constituting an illustrative embodiment of the present invention.

FIGURE 2 is a top view of the bottle shown in FIGURE 1, with the cup removed.

FIGURE 3 is an enlarged fragmentary sectional view taken generally along a line 3—3 in FIGURE 1 through the wall of the cup and the bottle.

FIGURE 4 is an elevational sectional view taken generally along a line 4—4 in FIGURE 2 but with the cup shown mounted on the bottle in the normal manner.

FIGURE 5 is a view similar to FIGURE 4, but with the cup in a position removed 180° from the position at which the cup is normally started on the bottle.

The exemplary embodiment shown in the drawings comprises a cup 10 which is adapted to serve as a cover for a vacuum bottle 12, as well as serving its ordinary function as a cup into which the contents of the bottle may be poured. In accordance with conventional practice, the bottle 12 comprises a shell 14 which is internally threaded at its upper end to receive an externally threaded collar 16 adapted to hold the usual replaceable vacuum flask 18 in the bottle 12.

Provision is made for detachably mounting the cup 10 on the bottle 12. To this end, the collar 16 comprises a cylindrical neck 19 formed with a plurality of external thread segments, a pair of such thread segments 20 and 21 being shown, arranged diametrically and extending through arcs substantially equal to but preferably somewhat less than 90°. In accordance with one feature of the invention the thread segments 20 and 21 constitute portions of a single helix, which, for example, may rise at a rate of six threads per inch as shown. In like manner, the cup 10 is formed with a complementary pair of diametrically-opposite internal thread segments 22 and 23 projecting inwardly from a cylindrical skirt portion or wall 24 formed at the lower end of the cup. The thread segments 22 and 23 extend through arcs of substantially 90° and likewise constituting portions of a single helix. Thus the cup 10 may be screwed onto the bottle 12 merely by placing the cup 10 over the collar 16, with the cup at such an angle that the internal thread segments 22 and 23 will move downwardly between the external thread segments 20 and 21, and then rotating the cup 10 clockwise through a quarter turn or less. Normally, the cup is started on the collar 16 with the lower end of the lower internal thread segment 22 adjacent the upper end of the lower external thread segment 20. When the cup is then turned clockwise, the lower and upper internal thread segments 22 and 23 will immediately move under the lower and upper external thread segments 20 and 21 (as shown in FIGS. 1, 3 and 4), so that the cup 10 may be locked on the bottle 12 with a minimum of rotation of the cup.

If the cup 10 is started on the collar 16 in a position (as shown in FIG. 5) removed by one-half revolution from the normal starting position, the lower end of the upper internal thread segment 23 will be adjacent the upper end of the lower external thread segment 20. Hence, clockwise rotation of the cup will tend to bring the upper internal thread segment 23 into collision with the lower external thread segment 20. In fact, there might be a possibility of the upper internal thread segment 23 being forced or wedged under the lower external thread segment 20 so that cup 10 would be mounted on the bottle 12 in cross-threaded relation. However, in accordance with the present invention, provision is made to prevent such cross threading of the cup onto the bottle. To this end the upper end of the lower external thread segment is formed with a beveled upper edge 26, which preferably is inclined upwardly at an angle of approximately 30° to the thread helix. Likewise, the upper internal thread segment 23 is provided at its lower end, with a beveled lower edge 28. Similar beveled edges 26 and 28 may also be formed on the upper external thread segment 21 and the lower internal thread segment 22, respectively, if desired.

If the cup 10 is started on the bottle 12 in an orientation removed 180° from the normal starting point, the lower end of the upper internal thread segment 23 will be positioned adjacent the upper end of the lower external thread segment 20, with the result that the lower beveled edge 28 of the thread segment 23 will move into engagement with the upper beveled edge 26 of the thread segment 20, when the cup 10 is rotated clockwise in the normal manner. The action of the beveled edges 26 and 28 is such that the thread segment 23 on the cup will be cammed upwardly and will slide over the top of the thread segment 20 on the collar 16. Accordingly, there will be no possibility of cross-threaded engagement between the cup 10 and the bottle 12. To mount the cup 10 on the bottle 12, it is merely necessary to continue the rotation of the cup 10 until the thread segments 22 and 23 engage the thread segments 20 and 21 on the collar 16 in the normal manner. This will require rotation of the cup through an extra half revolution, in addition to the quarter turn or less normally needed to lock the cup on the collar 16.

Thus, the cup may be mounted on the bottle 12 by a rotation of a quarter turn or less if the cup is started in the correct orientation or by at most a three-quarter turn rotation if the cup is started in an orientation removed 180° from the correct orientation. In any case, the cup may be removed by rotation through a quarter turn or less in a counter-clockwise direction.

In accordance with another aspect of the invention provision is made for preventing the thread segments 22 and 23 on the cup from becoming disengaged from or being shifted out of proper engagement with the thread segments 20 and 21 on the collar 16, as a result of outward springing of the cup wall 24. When the cup is screwed down very tightly on the collar 16, there is a tendency for such outward springing movement to occur, due to camming or wedging action between the cup threads 22 and 23 and the collar threads 20 and 21. This outward springing movement will distort the edge of the cup 10 into a non-circular shape. Accordingly, the outward springing movement of the cup wall 24, at points adjacent the threads 22 and 23, will tend to be accompanied by inward springing or collapsing movement of the cup wall at intermediate points. In some cases, the distortion of the cup 10 will be increased by the pressure exerted on the cup by the person gripping the vacuum bottle.

In the present case, this distortion of the cup into noncircular shape is controlled by limiting the inward springing movement of the cup wall. In this way, any outward springing movement of the cup wall adjacent the threads 22 and 23 is largely avoided. To prevent inward springing of the cup 10, an annular bead or outward projection 30 is formed on the collar 16 below the thread segments 20 and 21. Immediately below the bead 30, the collar 16 is provided with an outwardly extending annular shoulder 32 adapted to engage the lower edge of the cup 10. Thus, the bead 30 will be disposed immediately opposite the lower edge of the cup wall 24 when the cup 10 is mounted on the collar 16. By preventing inward collapsing movement on the lower cup edge, the bead 30 will prevent distortion of the cup into a non-circular shape. As a result, proper thread engagement will be maintained between the thread segments 20 and 21 on the collar 16 and the thread segments 22 and 23 on the cup 10.

Since the thread segments are portions of single helices, the cup 10 and bottle 12 are completely interchangeable with conventional cups and bottles having continuous single helical threads. The novel cup 10 may be screwed onto a conventional helically threaded bottle. Moreover, a conventional cup having a continuous helical thread may be screwed onto the novel bottle 12.

It will be understood that numerous modifications and substitutions of alternative and equivalent constructions may be made in the illustrative embodiment, the intention being to cover all such modifications, alternatives and equivalents as fall within the spirit and scope of the invention as set forth in the specification and defined in the following claims.

I claim:

1. In combination, a vacuum bottle having an upper cup receiving portion, a cup removably received over and around said cup-receiving portion, said cup-receiving portion having two diametrically opposite external thread segments constituting portions of a single helix, said cup having two complementary diametrically opposite internal thread segments formed thereon and in screw engagement with said thread segments on said vacuum bottle, said thread segments on said cup also constituting portions of a single helix, said thread segments on said cup being shorter than the spaces between said thread segments on said vacuum bottle and being movable therebetween for quick removal of said cup from said vacuum bottle and quick attachment of said cup thereto.

2. In combination, a vacuum bottle having an upper cup receiving portion, a cup removably received over and around said cup receiving portion, said cup receiving portion having a pair of diametrically opposite external thread segments extending through arcs of generally ninety degrees and constituting portions of a single helix, said cup having a pair of complementary internal thread segments formed thereon and in screw engagement with said external thread segments on said vacuum bottle, said internal thread segments also extending through arcs of generally ninety degrees but being shorter than the spaces between said external thread segments and being movable therebetween for quick removal of said cup from said vacuum bottle and quick attachment of said cup thereto, said internal thread segments also constituting portions of a single helix, the lower of said external thread segments on said vacuum bottle having an upper end portion formed with a beveled upper corner defining an upwardly facing ramp surface slanting in a direction opposite to the helical slant of said lower external thread segment, the upper of said internal thread segments on said cup having a lower end portion formed with a lower beveled corner defining a downwardly facing ramp surface slanting in a direction opposite to the helical slant of said upper internal thread segment, each of said ramp surfaces extending across substantially more than half of the corresponding thread segment, said downwardly facing ramp surface being engageable with said upwardly facing ramp surface to cam said cup upwardly and thereby prevent cross-threaded engagement of said external and internal thread segments.

3. In combination, a vacuum bottle including an upper neck portion having an external cylindrical surface formed with a pair of diametrically opposite outwardly projecting external thread segments constituting portions of a single helix, a cup removably received over and around said neck portion and provided with a springy generally cylindrical wall having an internal cylindrical surface received around said external cylindrical surface, said internal cylindrical surface being formed with a pair of diametrically opposite inwardly projecting internal thread segments constituting portions of another single helix complementary to the first mentioned helix, said internal thread segments being in disengageable threaded engagement with said external thread segments, the length of each of said thread segments on said cup being less than the space therebetween, the length of each of said thread segments on said vacuum bottle being less than the space therebetween, said internal cylindrical surface being substantially larger in radius than said external cylindrical surface, by an amount corresponding to the height of said thread segments to provide room for engagement of said thread segments between said cylindrical surfaces, and an enlarged annular guide portion formed on said neck portion immediately below the lower end of said external cylindrical surface, said enlarged guide portion corresponding in diameter to said internal cylindrical surface and being slidably received within the lower end portion thereof to provide internal support for the lower end of said cup so as to prevent inward springing movement of said cup at points between said thread segments thereon, said enlarged guide portion thereby being effective to maintain threaded engagement between said threaded segments on said cup and said neck portion when said cup is screwed very tightly onto said vacuum bottle.

4. In combination, a vacuum bottle including an upper neck portion having an external cylindrical surface formed with a pair of diametrically opposite outwardly projecting external thread segments, a cup removably received over and around said neck portion and provided with a springy generally cylindrical wall having an internal cylindrical surface received around said external cylindrical surface, said internal cylindrical surface being formed with a pair of complementary diametrically opposite inwardly projecting internal thread segments, said internal thread segments being in disengageable threaded engagement with said external thread segments, the length of each of said thread segments on said cup being less than the space therebetween, the length of each of said thread segments on said vacuum bottle being less than the space therebetween, said internal cylindrical surface being substantially larger in diameter than said external cylindrical surface, by an amount corresponding to the height of said thread segments to provide room for engagement of said thread segments between said cylindrical surfaces, and enlarged guide means projecting outwardly on said neck portion at the lower end of said external cylindrical surface and slidably received within the lower end of said internal cylindrical surface, said guide means providing internal support for said cup and thereby preventing inward springing movement of said cup at points between said thread segments thereon so as to maintain threaded engagement between said thread segments on said cup and said neck portion when said cup is screwed very tightly onto said vacuum bottle.

References Cited in the file of this patent

UNITED STATES PATENTS

| | | |
|---|---|---|
| 709,390 | Booth | Sept. 16, 1902 |
| 1,160,596 | Hammer | Nov. 16, 1915 |
| 1,220,267 | Park | Mar. 27, 1917 |
| 1,492,978 | Hammer | May 6, 1924 |
| 1,560,986 | Hammer | Nov. 10, 1925 |
| 1,784,089 | Carr | Dec. 9, 1930 |
| 1,855,039 | Wetmore | Apr. 19, 1932 |
| 2,162,880 | Brown | June 20, 1939 |
| 2,199,732 | Antonson | May 7, 1940 |

FOREIGN PATENTS

| | | |
|---|---|---|
| 368,910 | Germany | July 24, 1920 |
| 597,714 | France | Sept. 7, 1925 |
| 477,969 | Germany | June 18, 1929 |
| 101,134 | Sweden | Mar. 18, 1941 |
| 475,573 | Canada | July 31, 1951 |
| 1,004,855 | France | Dec. 5, 1951 |